(12) United States Patent
Kaler, Jr.

(10) Patent No.: US 9,945,615 B2
(45) Date of Patent: Apr. 17, 2018

(54) EVAPORATIVE COOLING SYSTEM AND DEVICE

(71) Applicant: George Michael Kaler, Jr., Trophy Club, TX (US)

(72) Inventor: George Michael Kaler, Jr., Trophy Club, TX (US)

(73) Assignee: Mestek Machinery, Inc., Westfield, MA (US)

( * ) Notice: Subject to any disclaimer, the term of this patent is extended or adjusted under 35 U.S.C. 154(b) by 865 days.

(21) Appl. No.: 13/784,967

(22) Filed: Mar. 5, 2013

(65) Prior Publication Data

US 2013/0233513 A1    Sep. 12, 2013

Related U.S. Application Data

(60) Provisional application No. 61/607,287, filed on Mar. 6, 2012.

(51) Int. Cl.
| | | |
|---|---|---|
| F28F 27/00 | (2006.01) | |
| F28D 15/00 | (2006.01) | |
| F28D 20/02 | (2006.01) | |
| F28F 23/00 | (2006.01) | |
| F28C 1/14 | (2006.01) | |
| F28D 5/00 | (2006.01) | |
| F28D 20/00 | (2006.01) | |

(52) U.S. Cl.
CPC .......... *F28D 15/00* (2013.01); *F28D 20/023* (2013.01); *F28F 23/00* (2013.01); *F28C 1/14* (2013.01); *F28D 5/00* (2013.01); *F28D 2020/0021* (2013.01); *Y02E 60/145* (2013.01)

(58) Field of Classification Search
CPC ................... F28D 15/00; F28D 20/023; F28D 2020/0021; F28D 5/00; F28D 23/00; Y02E 60/145; H05K 7/025
USPC .................................................. 165/121, 200
See application file for complete search history.

(56) References Cited

U.S. PATENT DOCUMENTS

| | | | | |
|---|---|---|---|---|
| 3,116,612 A | * | 1/1964 | Pennington | F24F 5/0035 261/DIG. 34 |
| 4,107,928 A | * | 8/1978 | Kelly | F01K 25/02 60/530 |
| 4,380,910 A | * | 4/1983 | Hood | F24F 5/0035 62/271 |
| 4,538,426 A | * | 9/1985 | Bock | F24F 5/0035 261/147 |
| 4,827,733 A | * | 5/1989 | Dinh | F24F 1/022 62/119 |
| 5,007,478 A | * | 4/1991 | Sengupta | F28D 20/023 165/10 |
| 5,056,588 A | * | 10/1991 | Carr | F24F 3/14 165/10 |

(Continued)

OTHER PUBLICATIONS

International Search Report from corresponding PCT Patent Application No. PCT/US2013/029087 dated May 3, 2013.

*Primary Examiner* — Claire Rojohn, III
(74) *Attorney, Agent, or Firm* — Grogan, Tuccillo & Vanderleeden, LLP

(57) ABSTRACT

An evaporative cooling system includes an indirect cooling coil containing a cooling fluid to be circulated and a blower assembly configured to generate an inlet air stream through the indirect cooling coil. The cooling fluid in the indirect cooling coil is a slurry of water and phase change material.

8 Claims, 3 Drawing Sheets

(56) References Cited

U.S. PATENT DOCUMENTS

| | | | | |
|---|---|---|---|---|
| 5,076,065 A * | 12/1991 | Brogan | F24F 5/0035 | 261/149 |
| 5,460,004 A * | 10/1995 | Tsimerman | B01D 53/261 | 62/271 |
| 5,505,060 A * | 4/1996 | Kozinski | F25B 39/022 | 165/132 |
| 6,857,285 B2 * | 2/2005 | Hebert | F24F 12/006 | 62/280 |
| 6,931,883 B2 * | 8/2005 | Bourne | F24F 5/0035 | 62/314 |
| 8,516,839 B2 * | 8/2013 | Hakbijl | F24F 5/0035 | 62/171 |
| 8,783,053 B2 * | 7/2014 | McCann | F24F 5/0035 | 261/146 |
| 9,021,821 B2 * | 5/2015 | Dunnavant | F24F 3/14 | 62/176.1 |
| 9,032,742 B2 * | 5/2015 | Dunnavant | F24F 12/006 | 62/259.2 |
| 9,055,696 B2 * | 6/2015 | Dunnavant | H05K 7/20745 | |
| 9,207,018 B2 * | 12/2015 | Jarvis | F28C 3/08 | |
| 9,315,710 B2 * | 4/2016 | Abhari | B29B 9/12 | |
| 2005/0066668 A1 * | 3/2005 | Barnwell | B01D 53/265 | 62/93 |
| 2005/0067137 A1 * | 3/2005 | Barnwell | B01D 53/265 | 165/11.1 |
| 2006/0231233 A1 * | 10/2006 | Farid | F28D 15/0266 | 165/10 |
| 2007/0044494 A1 * | 3/2007 | Ally | C09K 5/063 | 62/260 |
| 2010/0012291 A1 * | 1/2010 | Sporie | F24F 5/0035 | 165/61 |
| 2011/0162829 A1 * | 7/2011 | Xiang | C09K 5/063 | 165/234 |
| 2013/0228308 A1 * | 9/2013 | Abhari | C09K 5/063 | 165/104.17 |

* cited by examiner

EVAPORATIVE COOLING SYSTEM AND DEVICE

CROSS-REFERENCE TO RELATED APPLICATIONS

This application claims the benefit of U.S. Provisional Application Ser. No. 61/607,287, filed on Mar. 6, 2012, which is herein incorporated by reference in its entirety.

FIELD OF THE INVENTION

The present invention relates generally to evaporative cooling and, more particularly, to an indirect evaporative cooling system and device containing a slurry of phase change material.

BACKGROUND OF THE INVENTION

An evaporative cooler is a device that cools air through the evaporation of water. Existing evaporative cooling devices are typically rectangular in shape and have a shallow water reservoir which is supplied by the plumbing of the structure being cooled. A pump pulls water from the reservoir and pumps it through tubing to the top of the unit, where it flows down the sides and through pads that line the sides of the unit. An electric motor powers a fan in the center of the device, which serves to draw outside air through the pads and into the unit.

As the warm, outside air is drawn in through the porous pads by the fan, the latent heat in the air causes water flowing through the pads to evaporate. This evaporation is caused by a transfer of heat from the air to the water. This results in a net loss of heat in the air or, in other words, cooling. The now cooled air is then forced through an exit duct and into the area to be cooled.

Various types of evaporating cooling devices exist, including direct evaporative coolers, indirect evaporative coolers, and two-stage evaporative coolers, also known as indirect-direct evaporative coolers.

Direct evaporative coolers force outside air through a moist evaporative pad to produce cooled air prior to distributing the cool air to a target area. As discussed above, direct evaporative coolers typically have a blower or centrifugal fan that forces the outside air in through the evaporative pad to cool the air, and then out of the device into the target area.

Indirect evaporative coolers are similar to direct evaporative coolers, but instead utilize some type of heat exchanger. For example, in one type of indirect evaporative cooler, processing air is drawn into the device where heat in the air is absorbed by water in an air-to-water heat exchanger to produce cooled air. The heat in the water is then rejected in a cooling tower where the evaporation occurs. In this sense, indirect evaporative closed systems in that the water in the heat exchange absorbs heat from the air, rejects heat to atmosphere in a cooling tower, and recirculates to absorb more heat from the air. Typically, rather than distributing the cooled air into the target area directly, however, the device secondarily performs a heat exchanging process of reducing the temperature of inlet air by the cooled processing air, thus indirectly cooling the inlet air prior to distributing the air to the target room. Accordingly, the cooled, moist processing air never comes in direct contact with the cooled air entering the target area.

Lastly, indirect-direct evaporative coolers use both direct and indirect evaporative cooling in a two-stage process. In the first stage, warm air is pre-cooled indirectly without adding humidity (such as, for example, by passing inside a heat exchange that is cooled by evaporation on the outside). In the direct stage, the pre-cooled air passes through a water-soaked pad and picks up humidity as it cools. Since the air supply is pre-cooled in the first stage, less humidity is transferred in the direct stage, to reach the desired cooling temperatures. This results in cooler air with a relative humidity between 50-70%, depending on the climate, compared to a traditional system that produces about 70-80% relative humidity in the conditioned air.

As will be readily appreciated, water is a critical natural resource. As the available supply of water is becoming outstripped by demand, the cost of potable water may increase to the point where using it for air conditioning purposes, such is in evaporative coolers, could become prohibitive.

Accordingly, there is a need for an evaporative cooling device that requires less water to cool air than is typically required for existing devices.

SUMMARY OF THE INVENTION

It is an object of the present invention to provide an evaporative cooling device.

It is another object of the present invention to provide an evaporative cooling device of the indirect type.

It is another object of the present invention to provide an indirect evaporative cooling device that utilizes a lesser amount of water as compared to existing indirect cooling devices.

It is another object of the present invention to provide an indirect evaporative cooling device that utilizes a slurry of phase change material.

It is another object of the present invention to provide an indirect evaporative cooling device having a thermal battery bank utilized to cool inlet air.

According to the present invention an evaporative cooling system is provided. The evaporative cooling system includes an indirect cooling coil containing a cooling fluid to be circulated and a blower assembly configured to generate an inlet air stream through the indirect cooling coil. The cooling fluid is a slurry of water and phase change material.

In an embodiment of the present invention a cooling system is provided. The cooling system includes a cooling coil containing a cooling fluid to be circulated, a fan configured to generate an inlet air stream through the cooling coil, and a thermal battery bank arranged downstream from the indirect cooling coil and configured to absorb heat from said inlet air stream.

In another embodiment, an evaporative cooling device is provided. The evaporative cooling device includes a housing, a first heat exchanger containing a first cooling fluid to be circulated through the heat exchanger, and a fan configured to generate an inlet air stream through the first heat exchanger. The first cooling fluid includes a slurry of water and a phase change material.

According to the present invention, a method of cooling a target area includes initiating a flow of inlet air, cooling the inlet air by passing the inlet air through a thermal battery bank having a plurality of thermal battery pods containing a cooling fluid, and cooling the inlet air by passing the inlet air through a first heat exchanger containing a circulated cooling fluid when a cooling capability of the thermal battery bank is substantially exhausted.

These and other objects, features, and advantages of the present invention will become apparent in light of the detailed description of the best mode embodiment thereof, as illustrated in the accompanying drawings.

BRIEF DESCRIPTION OF THE DRAWINGS

The present invention will be better understood from reading the following description of non-limiting embodiments, with reference to the attached drawings, wherein below.

Other features and advantages of the present disclosure will become apparent from the following detailed description, taken in conjunction with the accompanying drawings, which illustrate, by way of example, the principals of the invention.

DETAILED DESCRIPTION OF THE PREFERRED EMBODIMENT

Figure 1:
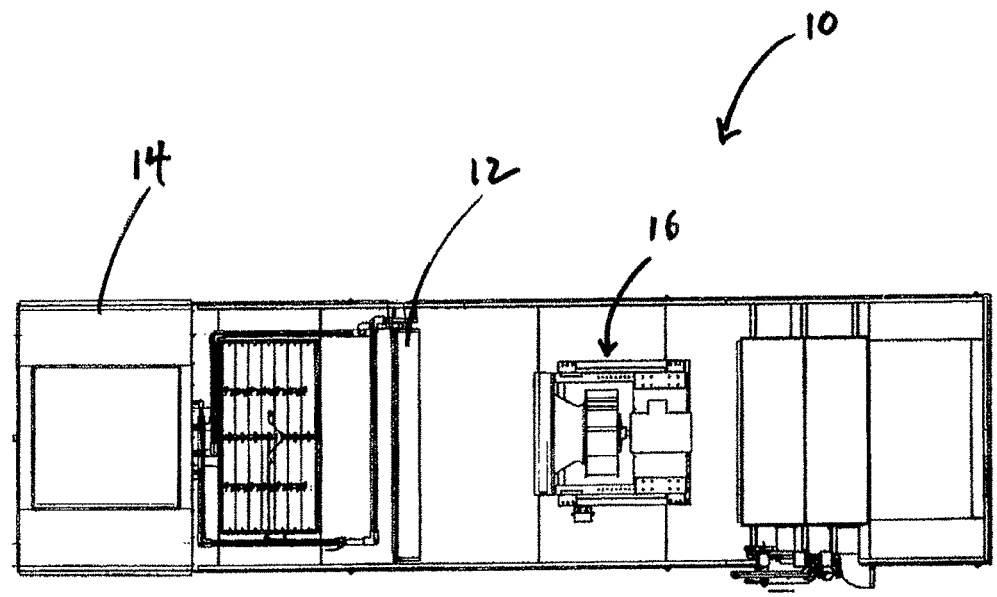
FIG. 1 is a top, plan view of an indirect evaporative cooling system according to an embodiment of the present invention.
Figure 2:
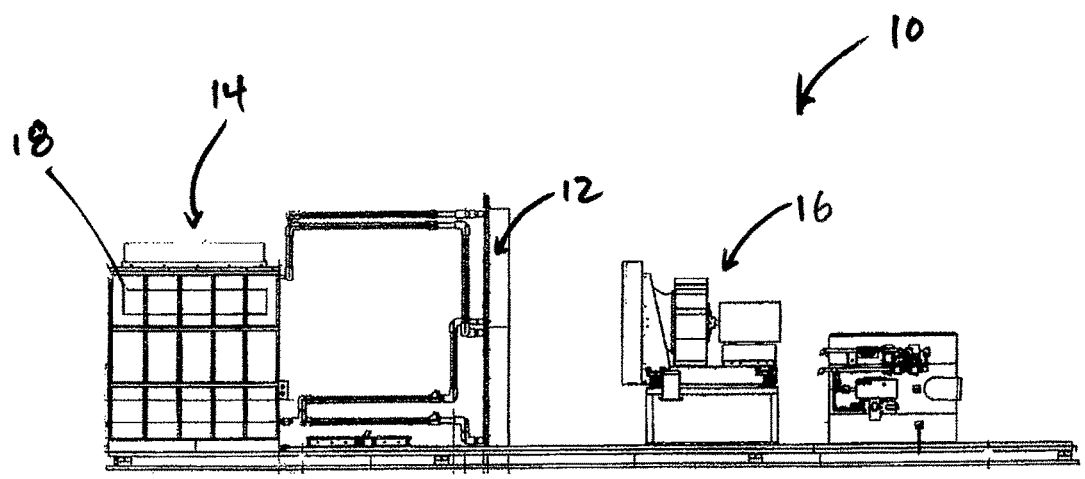
FIG. 2 is a side, elevational view of the indirect evaporative cooling system of FIG. 1.

Referring to FIGS. 1 and 2, an indirect evaporative cooling system 10 according to an embodiment of the present invention is shown. As will be readily appreciated, the configuration of the cooling system 10 is generally similar to existing indirect evaporative cooling systems/devices. The system 10 includes a first heat exchanger, namely a cooling coil 12, a cooling tower 14, a blower assembly 16 and an electric motor (not shown) electrically coupled to the blower. The blower assembly 16 is configured to draw inlet (outside) air into the system and pull the air through a face of the cooling coil 12. As warm inlet air passes through the cooling coil 12, heat from the air is transferred to a cooling fluid circulating within the cooling coil 12. The now-cooled inlet air may then be forced into a structure to provide cooling, as desired.

As best shown in FIG. 2, a portion of the cooling coil 12 is located within the cooling tower 14. A pump (not shown) continuously circulates the cooling fluid in the cooling coil 12 between the face of the cooling coil 12 adjacent to the blower 16 and the cooling tower 14. In particular, in operation, as heat is transferred from the inlet air to the cooling fluid to cool the inlet air, the cooling fluid is circulated through the coiling coil 12 and to the cooling tower 14. As also shown in FIG. 2, the cooling tower 14 includes a secondary heat exchanger 18, such as a liquid-to-liquid heat exchanger, fluidly isolated from the cooling coil 12. The secondary heat exchanger 18 serves to remove heat from the cooling fluid in the cooling coil 12 as it passes through the cooling tower 14, allowing the cooling fluid to "recharge."

Figure 3:
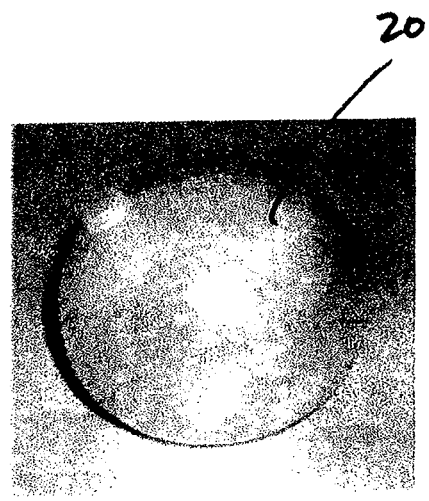
FIG. 3 is a perspective view of a small plastic ball containing a phase change material for use in the system of FIG. 1.

In an embodiment, the cooling fluid is a slurry that includes water and a phase-change material entrained in the water. Preferably, the phase change material is encapsulated in a plurality of small plastic balls 20, such as those shown in FIG. 3. In an embodiment, the phase change material has a latent heat absorption capacity that is roughly five (5) times that of water alone. In an embodiment, the phase change material is Micronal® DS 5008 X or Micronal® DS 5045 X, available from BASF, although other phase change materials having a latent heat absorption capacity approximately five times that of water may also be utilized without departing from the broader aspects of the present invention.

The slurry of water and encapsulated phase change material is continuously circulated between the indirect cooling coil 12 and the cooling tower 14. While in the indirect cooling coil 12 the slurry absorbs heat from the outside air, thereby cooling the air before the air enters a structure, as discussed above. Upon the slurry's return to the cooling tower 14, the absorbed heat from the slurry is removed, by heat transfer, in the secondary heat exchanger 18, to allow the cooling fluid and, in particular the phase change material, to recharge. In an embodiment, the heat transferred in the secondary heat exchanger from the cooling fluid can then be rejected to atmosphere.

Due to the significantly greater heat absorption of the cooling fluid slurry, the slurry allows the same degree of cooling effect to occur from an indirect evaporative cooling unit of a correspondingly smaller size. Thus, importantly, the amount of water used by the system is reduced.

Figure 4:
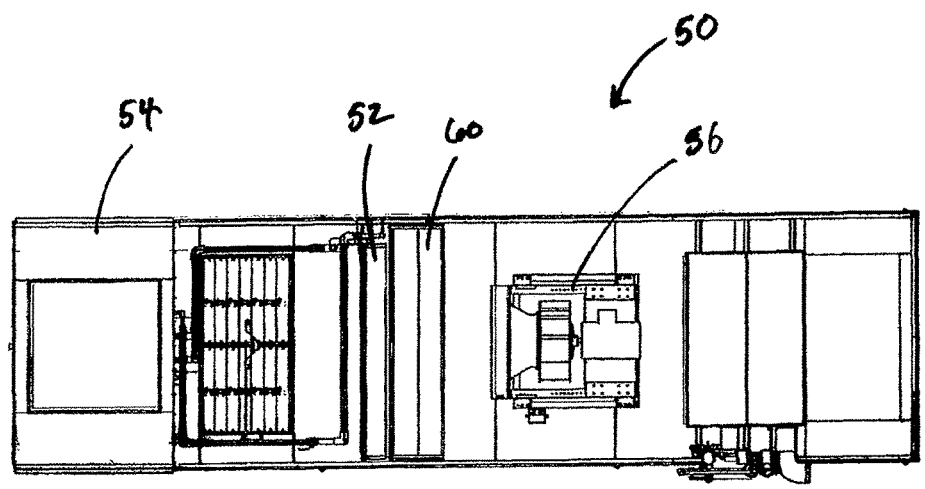
FIG. 4 is a top, plan view of an indirect evaporative cooling system according to another embodiment of the present invention.
Figure 5:
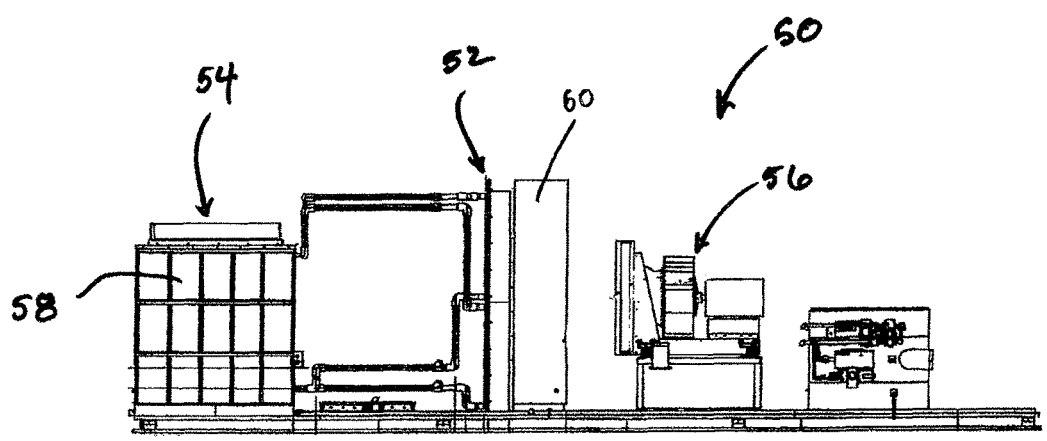
FIG. 5 is a side, elevational view of the indirect evaporative cooling system of FIG. 4.

With reference to FIGS. 4 and 5, an alternative embodiment of an indirect evaporative cooling system 50 is shown. The system 50 is substantially similar to the system 10 shown in FIGS. 1 and 2. In particular, the system 50 may include a cooling coil 52, a cooling tower 54, a blower assembly 56 and an electric motor (not shown) electrically coupled to the blower. The cooling tower 54 additional may include a secondary heat exchanger 158. The system 50 may also include a pump for circulating a fluid within the coil 52 and the secondary heat exchanger 58, respectively. As will be readily appreciated, the indirect cooling coil 52 may include water or a slurry of water and phase change material as discussed above.

As with the system 10, described above, blower 56 pulls inlet air through the cooling coil 52, whereby heat from the air is transferred to the cooling fluid within the cooling coil 52. The cooling fluid is circulated through the cooling coil 52 and to the cooling tower, where it enters the secondary heat exchanger 58. In the secondary heat exchanger 58, heat from the cooling fluid is rejected such that the cooling fluid can recharge and be circulated for cooling once again.

Figure 6:
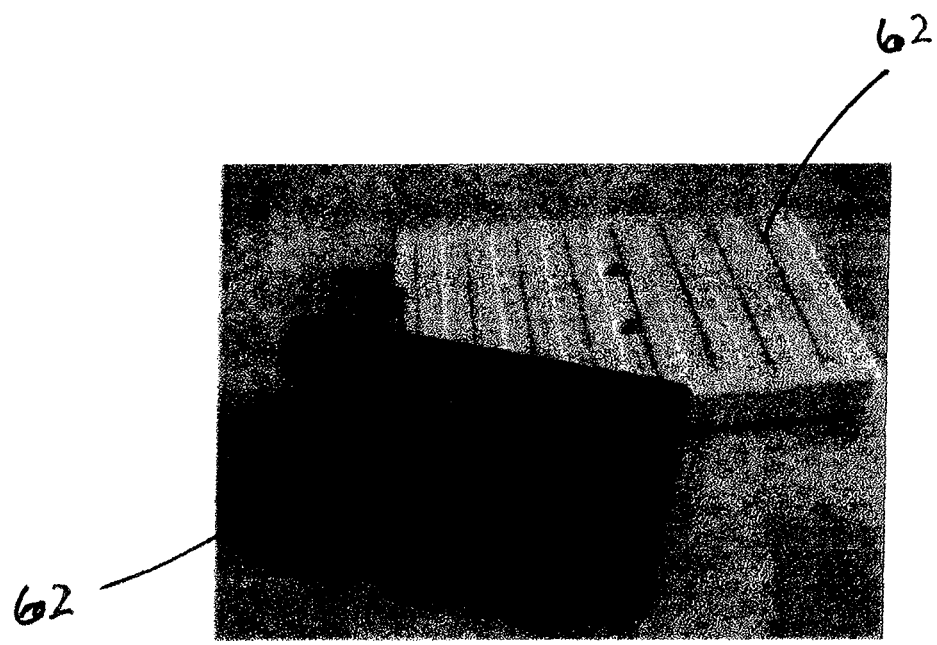
FIG. 6 is a perspective view of thermal battery pods containing a phase change material for use in the system of FIG. 4.

Importantly, however, the system 50 also includes a thermal battery bank 60 positioned in behind the indirect cooling coil 52 between the cooling coil 52 and the blower 56. The thermal battery bank 60 includes a plurality of individual thermal battery pods 62 containing a cooling fluid. In an embodiment, the thermal battery pods 62 are generally rectangular in shape, as shown in FIG. 6, and are arranged in stacks in the thermal battery bank 60. In an embodiment, the cooling fluid is a slurry of water and encapsulated phase change material. In an embodiment, the phase change material has a latent heat absorption capacity that is roughly five (5) times that of water alone.

After the inlet air is cooled by passing through the face of the indirect cooling coil 52, as discussed above, it is pulled through the thermal battery bank 60 for further cooling. In particular, as the air is pulled through the thermal battery bank 60, the cooling fluid within the pod absorbs additional heat from the air to further cooling the air before it enters a structure.

Importantly, the pods 62 are removably inserted into the thermal battery bank 60 to charge the thermal battery bank 60 with cooling during the night or at times of low ambient temperatures. Once charged, the thermal battery bank 60 servers to further cool the incoming building air until the pods 62 are completely discharged (whereby they can't absorb any more heat from the air). The pods 62 could then be recharged at night or at times of low ambient temperature.

Importantly, the thermal battery bank 60 may also be utilized in combination with known indirect evaporative cooling devices that are water driven. In particular, the thermal battery bank 60 may be utilized to cool the inlet air until the pods 62 have been exhausted of their cooling capability, at which time standard evaporative cooling through water evaporation may be utilized. As will be readily appreciated, this allows the evaporative cooling equipment to stay off-line for extended periods, thus, reducing the annual water consumption of the evaporative cooling equipment.

In an embodiment, either of the above-described systems 10, 50 and their components may be integrated into a housing so as to form an evaporative cooling device that may be installed in an opening in a structure.

One significant advantage of the thermal battery bank 60 is that the pods 62 are designed for installation in other types of equipment where it functions much like a traditional thermal storage system to shed electrical load during peak hours.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An evaporative cooling system, comprising:
   an indirect cooling coil containing a cooling fluid to be circulated; said cooling coil forming a recirculation loop and
   a blower assembly configured to generate an inlet air stream through said indirect cooling coil;
   a cooling tower containing a liquid-to-liquid secondary heat exchanger for cooling said cooling fluid circulated within said cooling coil;
   wherein said cooling coil is a first heat exchanger;
   wherein said liquid-to-liquid secondary exchanger is fluidly isolated from said cooling coil and said cooling fluid;
   wherein said cooling fluid is a slurry of water and phase change material;
   wherein said cooling fluid is recirculated in said first heat exchanger and reused for cooling air after being cooled in said secondary exchanger.

2. The evaporative cooling system according to claim 1, wherein:
   said phase change material is encapsulated in a plurality of balls.

3. The evaporative cooling system according to claim 1, wherein:
   said phase change material has a latent heat absorption capacity that is approximately 5 times that of water.

4. The evaporative cooling system according to claim 1, wherein:
   said phase change material is one of Micronal® DS 5008 X and Micronal® DS 5045 X.

5. The evaporative cooling system according to claim 1, wherein:
   said indirect cooling coil and said blower are contained within a housing.

6. The evaporative cooling system according to claim 1, further comprising:
   a pump configured to circulate said cooling fluid within said indirect cooling coil.

7. The evaporative cooling system according to claim 1, further comprising:
   a thermal battery bank positioned downstream from said indirect cooling coil, said thermal battery bank including a plurality of thermal battery pods containing a secondary cooling fluid.

8. The evaporative cooling system according to claim 7, wherein:
   said secondary cooling fluid is a slurry of water and phase change material.

* * * * *